US 6,613,471 B2

(12) United States Patent
Ovshinsky et al.

(10) Patent No.: US 6,613,471 B2
(45) Date of Patent: Sep. 2, 2003

(54) ACTIVE MATERIAL FOR FUEL CELL ANODES INCORPORATING AN ADDITIVE FOR PRECHARGING/ACTIVATION THEREOF

(75) Inventors: Stanford R. Ovshinsky, Bloomfield Hills, MI (US); Boyko Aladjov, Rochester Hills, MI (US); Srinivasan Venkatesan, Southfield, MI (US); Thomas Hopper, Clawson, MI (US); Kevin Fok, Troy, MI (US); Subhash Dhar, Bloomfield Hills, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 59 days.

(21) Appl. No.: 09/999,393

(22) Filed: Oct. 31, 2001

(65) Prior Publication Data

US 2002/0064709 A1 May 30, 2002

Related U.S. Application Data

(63) Continuation-in-part of application No. 09/524,116, filed on Mar. 13, 2000, now Pat. No. 6,447,942.

(51) Int. Cl.[7] .............................. H01M 4/86; H01M 4/58
(52) U.S. Cl. .............................. 429/42; 429/44; 429/27; 429/218.2; 429/105
(58) Field of Search ................................ 429/218.2, 44, 429/42, 105, 27

(56) References Cited

U.S. PATENT DOCUMENTS 6,447,942 B1 * 9/2002 Ovshinsky et al. ...... 429/218.2

FOREIGN PATENT DOCUMENTS

| JP | 5-225976 | * | 9/1993 |
| JP | 5-283070 | | 10/1993 |
| JP | 5-283070 A | * | 10/1993 |

* cited by examiner

Primary Examiner—Laura Weiner
(74) Attorney, Agent, or Firm—David W. Schumaker; Frederick W. Mau, II; Marvin S. Siskind (57) ABSTRACT

A hydrogen storage alloy active material for the anode of Ovonic instant startup/regenerative fuel cells. The active material includes a hydrogen storage alloy material with a water reactive chemical hydride additive, which, upon utilization of the active material in an anode of an alkaline electrolyte fuel cell, gives the anode added benefits, not attainable by using hydrogen storage alloy material alone. These added benefits include 1) precharge of the hydrogen storage material with hydrogen; 2) higher porosity/increased surface area/reduced electrode polarization at high currents; 3) simplified, faster activation of the hydrogen storage alloy; and 4) optionally, enhanced corrosion protection for the hydrogen storage alloy.

48 Claims, 4 Drawing Sheets

ACTIVE MATERIAL FOR FUEL CELL ANODES INCORPORATING AN ADDITIVE FOR PRECHARGING/ACTIVATION THEREOF

RELATED APPLICATIONS

This application is a continuation-in-part of U.S. patent application Ser. No. 09/524,116, filed Mar. 13, 2000, now U.S. Pat. No. 6,447,942, which is assigned to the same assignee as the current application.

FIELD OF THE INVENTION

The present invention relates to active materials for fuel cell anodes, and more specifically, hydrogen storage alloy active materials for the anode of Ovonic instant startup/regenerative fuel cells. The active material includes a hydrogen storage alloy material with an additive, which, upon utilization of the active material in an anode of an alkaline electrolyte fuel cell, gives the anode added benefits, not attainable by using hydrogen storage alloy material alone. These added benefits include 1) precharge of the hydrogen storage material with hydrogen; 2) higher porosity/increased surface area/reduced electrode polarization at high currents; 3) simplified, faster activation of the hydrogen storage alloy; and optionally 4) enhanced corrosion protection for the hydrogen storage alloy. These benefits are achieved by adding a water reactive chemical hydride to the hydrogen storage alloy used as the active material of the negative electrode of the alkaline fuel cell.

BACKGROUND OF THE INVENTION

As the world's human population expands, greater amounts of energy are necessary to provide the economic growth all nations desire. The traditional sources of energy are the fossil fuels which, when consumed, create significant amounts of carbon dioxide as well as other more immediately toxic materials including carbon monoxide, sulfur oxides, and nitrogen oxides. Increasing atmospheric concentrations of carbon dioxide are warming the earth; creating the ugly specter of global climatic changes. Energy-producing devices which do not contribute to such difficulties are needed now.

A fuel cell is an energy-conversion device that directly converts the energy of a supplied gas into an electric energy. Highly efficient fuel cells employing hydrogen, particularly with their simple combustion product of water, would seem an ideal alternative to current typical power generations means. Researchers have been actively studying such devices to utilize the fuel cell's potential high energy-generation efficiency.

The base unit of the fuel cell is a cell having a cathode, an anode, and an appropriate electrolyte. Fuel cells have many potential applications such as supplying power for transportation vehicles, replacing steam turbines and power supply applications of all sorts. Despite their seeming simplicity, many problems have prevented the widespread usage of fuel cells.

Presently most of the fuel cell R & D is focused on P.E.M. (Proton Exchange Membrane) fuel cells. Regrettably, the P.E.M. fuel cell suffers from relatively low conversion efficiency and has many other disadvantages. For instance, the electrolyte for the system is acidic. Thus, noble metal catalysts are the only useful active materials for the electrodes of the system. Unfortunately, not only are the noble metals costly and of limited availability, but they are also susceptible to poisoning by many gases, specifically carbon monoxide (CO). Also, because of the acidic nature of the P.E.M fuel cell electrolyte, the remainder of the materials of construction of the fuel cell need to be compatible with such an environment, which again adds to the cost thereof. The proton exchange membrane itself is quite expensive, and because of it's low proton conductivity at temperatures below 80° C., inherently limits the power performance and operational temperature range of the P.E.M. fuel cell as the PEM is nearly non-functional at low temperatures. Also, the membrane is sensitive to high temperatures, and begins to soften at 120° C. The membrane's conductivity depends on water and dries out at higher temperatures, thus causing cell failure. Therefore, there are many disadvantages to the P.E.M. fuel cell which make it somewhat undesirable for commercial/consumer use.

The conventional alkaline fuel cell has some advantages over P.E.M. fuels cells in that they have higher operating efficiencies, they use less costly materials of construction, and they have no need for expensive membranes. While the conventional alkaline fuel cell is less sensitive to temperature than the PEM fuel cell, platinum active materials are used in conventional alkaline fuel cell electrodes. Unfortunately, conventional alkaline fuel cells still suffer from their own disadvantages.

For example, conventional alkaline fuel cells still use expensive noble metal catalysts in both electrodes, which, as in the P.E.M. fuel cell, are susceptible to gaseous contaminant poisoning. The conventional alkaline fuel cell is also susceptible to the formation of carbonates from $CO_2$ produced by oxidation of the anode carbon substrates or introduced via impurities in the fuel and air used at the electrodes. This carbonate formation clogs the electrolyte/electrode surface and reduces/eliminates the activity thereof. The invention described herein eliminates this problem from the anode.

Fuel cells, like batteries, operate by utilizing electrochemical reactions. Unlike a battery, in which chemical energy is stored within the cell, fuel cells generally are supplied with reactants from outside the cell. Barring failure of the electrodes, as long as the fuel, preferably hydrogen, and oxidant, typically air or oxygen, are supplied and the reaction products are removed, the cell continues to operate.

Fuel cells offer a number of important advantages over internal combustion engine or generator systems. These include relatively high efficiency, environmentally clean operation especially when utilizing hydrogen as a fuel, high reliability, few moving parts, and quiet operation. Fuel cells potentially are more efficient than other conventional power sources based upon the Carnot cycle.

The major components of a typical fuel cell are the anode for hydrogen oxidation and the cathode for oxygen reduction, both being positioned in a cell containing an electrolyte (such as an alkaline electrolytic solution). Typically, the reactants, such as hydrogen and oxygen, are respectively fed through a porous anode and cathode and brought into surface contact with the electrolytic solution. The particular materials utilized for the cathode and anode are important since they must act as efficient catalysts for the reactions taking place.

In an alkaline fuel cell, the reaction at the anode occurs between the hydrogen fuel and hydroxyl ions (OH⁻) present in the electrolyte, which react to form water and release electrons:

At the cathode, the oxygen, water, and electrons react in the presence of the cathode catalyst to reduce the oxygen and form hydroxyl ions (OH⁻):

$$O_2 + 2H_2O + 4e^- \rightarrow 4OH^- \quad E_0 = -0.401 \text{ v.}$$

The total reaction, therefore, is:

$$2H_2 + O_2 \rightarrow 2H_2O \quad E_0 = -1.229 \text{ v}$$

The flow of electrons is utilized to provide electrical energy for a load externally connected to the anode and cathode.

It should be noted that the anode catalyst of the alkaline fuel cell is required to do more than catalyze the reaction of $H^+$ ions with $OH^-$ ions to produce water. Initially the anode must catalyze and accelerate the formation of $H^+$ ions and $e^-_{\text{from } H_2}$. This occurs via formation of atomic hydrogen from molecular hydrogen. The overall reaction may be simplified and presented (where M is the catalyst) as:

$$M + H_2 \rightarrow 2M \ldots H \rightarrow M + 2H^+ + 2e^-.$$

Where M . . . H denotes atomic hydrogen adsorbed on the catalyst. Thus the anode catalyst must not only efficiently catalyze the electrochemical reaction for formation of water at the electrolyte interface, but must also efficiently dissociate molecular hydrogen into atomic hydrogen. Using conventional anode material, the dissociated hydrogen is transitional and the hydrogen atoms can easily recombine to form hydrogen if they are not used very efficiently in the oxidation reaction. With the hydrogen storage anode materials of the inventive instant startup fuel cells, hydrogen is stored in hydride form as soon as they are created, and then are used as needed to provide power.

In addition to being catalytically efficient on both interfaces, the catalytic material must be resistant to corrosion by the alkaline electrolyte. Without such corrosion resistance, the electrode would quickly succumb to the harsh environment and the cell would quickly lose efficiency and die.

One prior art fuel cell anode catalyst is platinum. Platinum, despite its good catalytic properties, is not very suitable for wide scale commercial use as a catalyst for fuel cell anodes, because of its very high cost, and the limited world supply. Also, noble metal catalysts like platinum, also cannot withstand contamination by impurities normally contained in the hydrogen fuel stream. These impurities can include carbon monoxide which may be present in hydrogen fuel or contaminants contained in the electrolyte such as the impurities normally contained in untreated water including calcium, magnesium, iron, and copper.

The above contaminants can cause what is commonly referred to as a "poisoning" effect. Poisoning occurs where the catalytically active sites of the material become inactivated by poisonous species invariably contained in the fuel cell. Once the catalytically active sites are inactivated, they are no longer available for acting as catalysts for efficient hydrogen oxidation reaction at the anode. The catalytic efficiency of the anode therefore is reduced since the overall number of available catalytically active sites is significantly lowered by poisoning. In addition, the decrease in catalytic activity results in increased over-voltage at the anode and hence the cell is much less efficient adding significantly to the operating costs. Overvoltage is the difference between the actual working electrode potential under some conditions and its equilibrium value, the physical meaning of overvoltage is the voltage required to overcome the resistance to the passage of current at the surface of the anode (charge transfer resistance). The overvoltage represents an undesirable energy loss which adds to the operating costs of the fuel cell.

In related work, U.S. Pat. No. 4,623,597 ("the '597 patent") and others in it's lineage, the disclosure of which is hereby incorporated by reference, one of the present inventors, Stanford R. Ovshinsky, described disordered multi-component hydrogen storage materials for use as negative electrodes in electrochemical cells for the first time. In this patent, Ovshinsky describes how disordered materials can be tailor made (i.e., atomically engineered) to greatly increase hydrogen storage and reversibility characteristics. Such disordered materials are amorphous, microcrystalline, intermediate range order, and/or polycrystalline (lacking long range compositional order) wherein the polycrystalline material includes topological, compositional, translational, and positional modification and disorder. The framework of active materials of these disordered materials consist of a host matrix of one or more elements and modifiers incorporated into this host matrix. The modifiers enhance the disorder of the resulting materials and thus create a greater number and spectrum of catalytically active sites and hydrogen storage sites.

The disordered electrode materials of the '597 patent were formed from lightweight, low cost elements by any number of techniques, which assured formation of primarily non-equilibrium metastable phases resulting in the high energy and power densities and low cost. The resulting low cost, high energy density disordered material allowed the batteries to be utilized most advantageously as secondary batteries, but also as primary batteries.

Tailoring of the local structural and chemical order of the materials of the '597 patent was of great importance to achieve the desired characteristics. The improved characteristics of the anodes of the '597 patent were accomplished by manipulating the local chemical order and hence the local structural order by the incorporation of selected modifier elements into a host matrix to create a desired disordered material. Disorder permits degrees of freedom, both of type and of number, within a material, which are unavailable in conventional materials. These degrees of freedom dramatically change a materials physical, structural, chemical and electronic environment. The disordered material of the '597 patent have desired electronic configurations which result in a large number of active sites. The nature and number of storage sites were designed independently from the catalytically active sites.

Multiorbital modifiers, for example transition elements, provided a greatly increased number of storage sites due to various bonding configurations available, thus resulting in an increase in energy density. The technique of modification especially provides non-equilibrium materials having varying degrees of disorder provided unique bonding configurations, orbital overlap and hence a spectrum of bonding sites. Due to the different degrees of orbital overlap and the disordered structure, an insignificant amount of structural rearrangement occurs during charge/discharge cycles or rest periods there between resulting in long cycle and shelf life.

The improved battery of the '597 patent included electrode materials having tailor-made local chemical environments which were designed to yield high electrochemical charging and discharging efficiency and high electrical charge output. The manipulation of the local chemical environment of the materials was made possible by utilization of a host matrix which could, in accordance with the '597 patent, be chemically modified with other elements to create a greatly increased density of electro-catalytically active sites and hydrogen storage sites.

The disordered materials of the '597 patent were designed to have unusual electronic configurations, which resulted from the varying 3-dimensional interactions of constituent atoms and their various orbitals. The disorder came from compositional, positional and translational relationships of atoms. Selected elements were utilized to further modify the disorder by their interaction with these orbitals so as to create the desired local chemical environments.

The internal topology that was generated by these configurations also allowed for selective diffusion of atoms and ions. The invention that was described in the '597 patent made these materials ideal for the specified use since one could independently control the type and number of catalytically active and storage sites. All of the aforementioned properties made not only an important quantitative difference, but qualitatively changed the materials so that unique new materials ensued.

Disorder can be of an atomic nature in the form of compositional or configurational disorder provided throughout the bulk of the material or in numerous regions of the material. The disorder also can be introduced by creating microscopic phases within the material which mimic the compositional or configurational disorder at the atomic level by virtue of the relationship of one phase to another. For example, disordered materials can be created by introducing microscopic regions of a different kind or kinds of crystalline phases, or by introducing regions of an amorphous phase or phases, regions of an amorphous phase or phases in addition to regions of a crystalline phase or phases. The interfaces between these various phases can provide surfaces which are rich in local chemical environments which provide numerous desirable sites for electrochemical hydrogen storage.

These same principles can be applied within a single structural phase. For example, compositional disorder is introduced into the material which can radically alter the material in a planned manner to achieve important improved and unique results, using the Ovshinsky principles of disorder on an atomic or microscopic scale.

Additionally, in copending U.S. application Ser. No. 09/524,116, ('116), the disclosure of which is hereby incorporated by reference, Ovshinsky has employed the principles of atomic engineering to tailor materials which uniquely and dramatically advance the fuel cell art. The invention of '116 application has met a need for materials which allow fuel cells to startup instantaneously by providing an internal source of fuel, to operate in a wide range of ambient temperatures to which a fuel cell will be exposed to under ordinary consumer use and to allow the fuel cell to be run in reverse as an electrolyzer thereby utilizing/storing recaptured energy. The anodes of the '116 fuel cells are formed from relatively inexpensive hydrogen storage materials which are highly catalytic to the dissociation of molecular hydrogen and the formation of water from hydrogen and hydroxyl ions as well as being corrosion resistant to the electrolyte, resistant to contaminant poisoning from the reactant stream and capable of working in a wide temperature range.

Thus, Ovonic Regenerative Fuel Cells use metal hydrides that are capable of reversibly absorbing/desorbing hydrogen from the gas phase as well as electrochemically. Both these reactions should have fast kinetics and be reversible in order to sustain the reaction continuously. The hydrogen gas entering from the gas side of the anode will continuously hydride the Ovonic alloy to form metal hydrides. At the same time continuous electrochemical discharge from the electrolyte side will deplete the hydride regenerating the Ovonic alloy. The hydriding and dehydriding are a dynamic processes that need to occur efficiently to keep the fuel cell working well.

One problem encountered in the actual running of the cell involves activation or forming of the electrodes. Conventional activation of any hydride former is accomplished by repeatedly absorbing and desorbing hydrogen under pressure. In using the Ovonic Metal Hydrides in fuel cells, this cannot be done by the conventional method because the cells are not designed to stand high pressures or temperatures. Hence an electrochemical pulsing is used as a method of activating the electrodes on the gas and electrolyte side simultaneously. This pulsing involves quick bursts of electrochemical charging and discharging for several cycles. The gas side is continuously supplied with hydrogen during this formation. While this procedure works, it involves a fair amount of time to accomplish the desired level of activation. It also involves assembling, disassembling and reassembling of the working and counter electrodes. This disassembly and reassembly inevitably exposes the activated electrodes to atmosphere leading to oxidation. Mechanical integrity of the electrode is also adversely affected by the assembly and disassembly operations.

There are a few options to solve this problem. They are: 1) prehydride the powders before making the electrodes; 2) prehydride the electrodes; and 3) externally charge the electrodes electrochemically and assemble the cell. These options are not practical because: 1) prehydrided powders cannot be handled safely and are also susceptible to oxidation; 2) prehydrided electrodes will lose their integrity in the prehydriding chambers and are also highly susceptible to oxidation; and 3) externally charged electrodes will have both sides exposed to electrolyte thus compromising the integrity of the hydrophobic sealing layer. It is also difficult to prevent them from oxidizing.

Thus what is needed is a practical method of precharging/activating the electrode with hydrogen and electrode materials for performing such precharging/activation.

SUMMARY OF THE INVENTION

The present invention is a hydrogen storage alloy active material for the negative electrode of Ovonic instant startup/regenerative fuel cells. The active material includes a hydrogen storage alloy material with an additive, which, upon utilization of the active material in an anode of an alkaline electrolyte fuel cell, gives the anode added benefits, not attainable by using hydrogen storage alloy material alone. These added benefits include 1) precharge of the hydrogen storage material with hydrogen; 2) higher porosity/increased surface area/reduced electrode polarization at high currents; 3) simplified, faster activation of the hydrogen storage alloy; and 4) optionally, enhanced corrosion protection for the hydrogen storage alloy. These benefits are achieved by adding a water reactive chemical hydride to the hydrogen storage alloy used as the active material of the negative electrode of the alkaline fuel cell.

An example of such a chemical hydride is sodium borohydride. Other chemical hydrides, such as alkali and alkaline earth metal hydrides may be used. Examples of such hydrides are LiAl hydrides ($LiAlH_6$), KH, NaH, and $CaNi_5H_6$. All of these chemical hydride will serve the same basic purpose. The chemical hydrides are chosen such that they are unstable in the presence of water and react therewith to produce hydrogen. Preferably the chemical hydride is stable in air. The chemical hydride should be selected such that its reaction byproduct with water minimally has no deleterious effect on the fuel cell operation and may be selected such that its byproduct has a beneficial effect (such as corrosion inhibition) on the fuel cell. In any event, the byproduct should at least be inert to the fuel cell's main chemical reactions for converting hydrogen and oxygen into water and energy.

DETAILED DESCRIPTION OF THE INVENTION

The present invention is a hydrogen storage alloy active material for the negative electrode of Ovonic instant startup/regenerative fuel cells. The active material includes a hydrogen storage alloy material with an additive, which, upon utilization of the active material in an anode of an alkaline electrolyte fuel cell, gives the anode added benefits, not attainable by using hydrogen storage alloy material alone. These added benefits include 1) precharge of the hydrogen storage material with hydrogen; 2) higher porosity/increased surface area/reduced electrode polarization at high currents; 3) simplified, faster activation of the hydrogen storage alloy; and 4) optionally, enhanced corrosion protection for the hydrogen storage alloy. These benefits are achieved by adding a water reactive chemical hydride to the hydrogen storage alloy used as the active material of the negative electrode of the alkaline fuel cell.

The water reactive chemical hydride is a material which, upon exposure to water (in the alkaline electrolyte) reacts to form atomic hydrogen and a reaction byproduct. One example of such a water reactive hydride is sodium borohydride ($NaBH_4$). When exposed to water the sodium borohydride reacts with the water to form sodium borate and hydrogen. Since the chemical hydride is in intimate contact with the hydrogen storage alloy, this hydrogen is quickly adsorbed into the hydrogen storage alloy where it is stored in the form of a hydride. The formulas for this reaction are as follows:

$NaBH_4 + 2H_2O \rightarrow NaBO_2 + 4H_2$; and $M + \frac{1}{2}H_2 \rightarrow M-H$ Thus, the reaction of the water reactive hydride with the water in the electrolyte of the fuel cell creates hydrogen which is adsorbed into the hydrogen storage alloy of the electrode, thereby precharging the alloy with hydrogen. This precharging is advantageous in that it eliminates the need to form electrodes from charged hydrogen storage alloys, which are pyrophoric and difficult to handle and process.

In addition to precharging the hydrogen storage alloy, the reaction of the chemical hydride with the water produces additional porosity in the active material of the electrode. That is, when the chemical hydride reacts with water to produce hydrogen, the hydrogen is immediately adsorbed into the hydrogen storage alloy and additional porosity is formed. Also, if the reaction byproduct is soluble in the aqueous electrolyte, even more porosity is formed. Thus in the reaction above, the reaction of sodium borohydride with water forms hydrogen, which, when adsorbed by the hydrogen storage alloy, leaves behind fresh pores. The reaction byproduct, sodium borate, then dissolves into the electrolytes, creating even more porosity.

Figure 1:
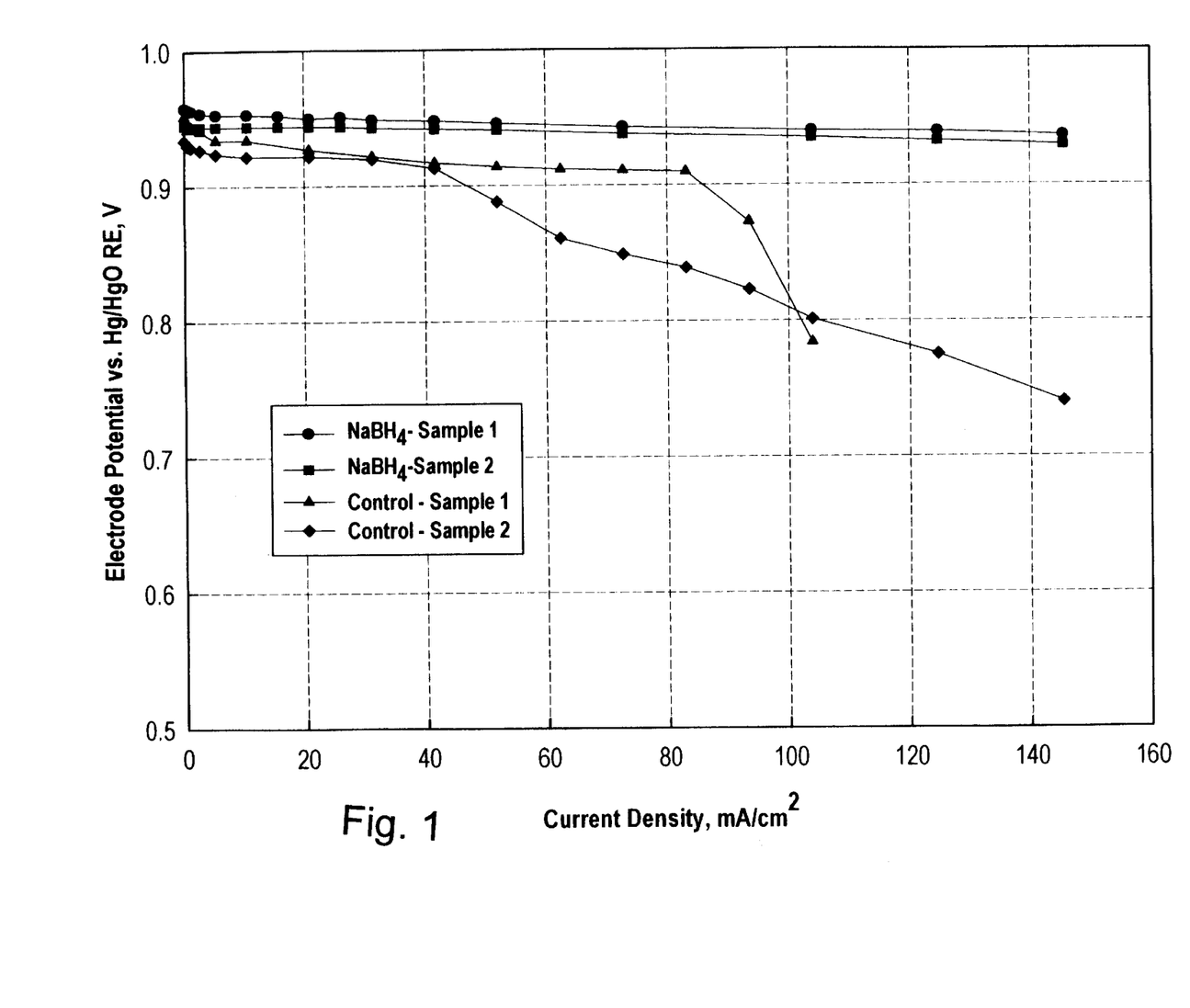
FIG. 1 plots the half cell voltage of negative electrodes on the ordinate axis versus the nominal current density on the abscissa axis for control and inventive samples.

This increase in porosity of the active material of the negative electrode of the fuel cell enhances the electrochemical performance of the electrode. The increased porosity increases the effective surface area of the electrode, thereby decreasing the actual current density of the electrode (although the geometric current density is increased, i.e. the geometric area of the electrode does not change, but the current through the electrode changes due to the increased actual surface area). That is, since current density is equal to the current divided by the electrode surface area, an increase in porosity, increases the surface area and thus decreases the current density of the electrode. This decrease in current density, in turn leads to a decrease in polarization of the electrode. Polarization, put simply, is the loss of electrode potential, at high current. This reduction in polarization can be seen in FIG. 1. FIG. 1 plots the half cell voltage (in volts versus a Hg/HgO reference electrode) of negative electrodes on the ordinate axis versus the nominal current density ($mA/cm^2$ of electrode area, measured by a simple length times width calculation, as opposed to true surface area) on the abscissa axis for control and inventive samples.

Anodes for both the control and inventive samples were produced using an anode active hydrogen storage alloy having the nominal composition of, in atomic percent, 10.5% La, 4.3% Ce, 0.5 Pr, 1.4% Nd, 60.0% Ni, 12.7% Co, 5.9% Mn and 4.7% Al. The control sample anodes were produced by mixing 2 weight percent polytetrafluoroethylene (PTFE) with 98 weight percent of the anode active hydrogen storage alloy. The mixture was then applied to a foamed nickel substrate, which served as the current collector for the electrode. The inventive sample anodes were created similarly by mixing 2 weight percent polytetrafluoroethylene (PTFE) with 97 weight percent of the anode active hydrogen storage alloy and 1 weight percent of sodium borohydride.

The anodes, were evaluated using a half cell technique. The anodes were tested as fuel cell electrodes by placing them in a special compartment where one side of the anode was exposed to a source of pure hydrogen gas, while the other side of the same anode was exposed to an aqueous alkaline electrolyte composed of 30 weight percent potassium hydroxide. Appropriate sealing was used to prevent the electrolyte from entering the gas compartment and vice-versa. A nickel foam counter electrode was immersed in the electrolyte compartment and a third, Hg/HgO electrode was also immersed in the electrolyte compartment to serve as a reference electrode.

The electrodes were then electrochemically activated using the techniques of our copending U.S. patent application Ser. No. 10/039,544, entitled "Method of Fuel Cell Activation", filed on Jan. 8, 2002, hereby incorporated by reference. The anodes were then evaluated using a polarization test whereby the discharge current was gradually increased while monitoring the change in potential versus the reference Hg/HgO electrode. As can be seen from a perusal of FIG. 1, the plots for control samples, without a chemical hydride additive (symbols ▲ and ♦) show a marked decrease in electrode voltage at higher discharge current densities, while the plots for inventive samples having a sodium borohydride additive (symbols ● and ■) show almost no decrease in voltage (almost no polarization) even at discharge current densities approaching 150 $mA/cm^2$. Thus, the addition of a chemical hydride to the electrode materials allows for electrode with increased porosity, which in turn allows for higher geometric current densities within the electrode and ultimately higher power fuel cells.

In addition to the precharging and reduced polarization benefits described herein above, another added benefit from the water reactive chemical hydride additive is that of electrode activation. This is advantageous as the fuel cell electrodes cannot be activated in the same manner as electrodes for batteries. Typically battery electrodes are activated by either 1) immersing the active hydrogen storage material or the electrodes produced therefrom in a concentrated aqueous solution of potassium hydroxide at elevated temperatures; or 2) in-situ activation of the electrodes in the battery by electrochemical charge/discharge cycling in the presence of the aqueous potassium hydroxide electrolyte. The fuel cell anodes are damaged by such activation because the gas phase side of the electrode cannot withstand the process and still be useful for gas phase hydrogen absorption. Alternatively, a typical gas phase material is activated by charging and discharging the hydrogen storage material with gaseous hydrogen. This technique works for the gas phase side of the anode, but the activation is very slow. Thus, the addition of the water reactive chemical hydride additive speeds up the activation of the electrode. This activation assistance is used in conjunction with the electrochemical activation of the electrolyte facing surface to completely activate the anodes in shorter period of time using fewer charge/discharge pulse cycles. The electrochemical activation involves charging and discharging the electrolyte facing side of the anode using hydrogen ions from the electrolyte and a nickel counter electrode. The gas phase side of the anode is activated by the absorbed hydrogen that is released from reaction of the chemical hydride with the water in the electrolyte. The activation process changes the hydrogen storage alloy anode from its as-produced state by 1) breakup and dissolution of the oxide surface of the alloy particles, as well as 2) cracking of the alloy particles, thereby exposing un-oxidized catalytic surfaces.

Another, optional, benefit from using the water reactive chemical hydride additive is that of corrosion inhibition. That is, the reaction byproduct of some chemical hydrides may provide the fuel cell electrodes with corrosion inhibition. This is true of the sodium borate byproduct of the sodium borohydride additive. While not all chemical hydride byproducts will necessarily produce this result, it is an added optional benefit to be considered when selecting the chemical hydride additive to be used.

It should be noted that, in addition to sodium borohydride, other chemical hydrides, such as alkali and alkaline earth metal hydrides may be used. Examples of such hydrides are LiAl hydrides (LiAlH$_6$), KH, NaH, and CaNi$_5$H$_6$. All of these chemical hydrides will serve the same basic purpose. The chemical hydrides are chosen such that they are unstable in the presence of water and react therewith to produce hydrogen. Preferably the chemical hydride is stable in air. In the case of CaNi$_5$H$_6$, the decomposition thereof in the presence of water will not only serve to precharge the anode, but will also leave behind a thin layer of nickel film which will act as an additional catalyst. The chemical hydride should be selected such that its reaction byproduct with water minimally has no deleterious effect on the fuel cell operation and may be selected such that its byproduct has a beneficial effect (such as corrosion inhibition) on the fuel cell. In any event, the byproduct should at least be inert to the fuel cell's main chemical reactions for converting hydrogen and oxygen into water and energy.

While a specific hydrogen storage alloy is described herein above, the hydrogen storage alloy active material is any hydrogen storage alloy which can reversibly absorb and release hydrogen irrespective of the hydrogen storage capacity and has the properties of a fast hydrogenation reaction rate, a good stability in the electrolyte and a long shelf-life. It should be noted that, by hydrogen storage capacity, it is meant that the material stores hydrogen in a stable form, in some nonzero amount higher than trace amounts. Preferred materials will store about 0.1 weight % hydrogen or more. Preferably, the alloys include, for example, rare-earth/Misch metal alloys, zirconium and/or titanium alloys or mixtures thereof. The anode material may even be layered such that the material on the hydrogen input surface is formed from a material which has been specifically designed to be highly catalytic to the dissociation of molecular hydrogen into atomic hydrogen, while the material on electrolyte interface surface is designed to be highly catalytic to the formation of water from hydrogen and hydroxyl ions.

Certain hydrogen storage materials are exceptionally useful as alkaline fuel cell anode materials. The useful hydrogen storage alloys have excellent catalytic activity for the formation of hydrogen ions from molecular hydrogen and also have superior catalytic activity toward the formation of water from hydrogen ions and hydroxyl ions. In addition to having exceptional catalytic capabilities, the materials also have outstanding corrosion resistance toward the alkaline electrolyte of the fuel cell. In use, the alloy materials act as 1) a molecular hydrogen decomposition catalyst throughout the bulk of the anode; 2) as as catalyst to convert hydrogen and hydroxyl ions into water at the electrolyte surface of the anode; and 3) as an internal hydrogen storage buffer to insure that a ready supply of hydrogen ions is always available at the electrolyte surface of the anode (this capability is useful in situations such as fuel cell startup and regenerative energy recapture, discussed herein below).

Specific alloys useful as the anode material are alloys that contain enriched catalytic nickel regions of 50–70 Angstroms in diameter distributed throughout the oxide interface which vary in proximity from 2–300 Angstroms preferably 50–100 Angstroms, from region to region. As a result of these nickel regions, the materials exhibit significant catalysis and conductivity. The density of Ni regions in the alloy of the '591 patent provides powder particles having an enriched Ni surface. The most preferred alloys having enriched Ni regions are alloys having the following composition:

(Base Alloy)$_a$Co$_b$Mn$_c$Fe$_d$Sn$_e$ where the Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr; b is 0 to 7.5 atomic percent; c is 13 to 17 atomic percent; d is 0 to 3.5 atomic percent; e is 0 to 1.5 atomic percent; and a+b+c+d+e=100 atomic percent.

While the specific example herein above uses 2 weight percent PTFE as a binder for the anode, more PTFE can be added as needed to prevent leakage of electrolyte into the hydrogen input chamber and vise-versa. The addition of PTFE can range as high as 30 weight percent or more depending upon the specific fuel cell, anode substrate and active materials used.

While a detailed discussion of the instant electrodes and their utilization in an alkaline fuel cell is described herein below, it should be noted that the concepts of the instant invention can be applied to other types of fuel cells, such as, for example, PEM fuel cells.

Figure 2:
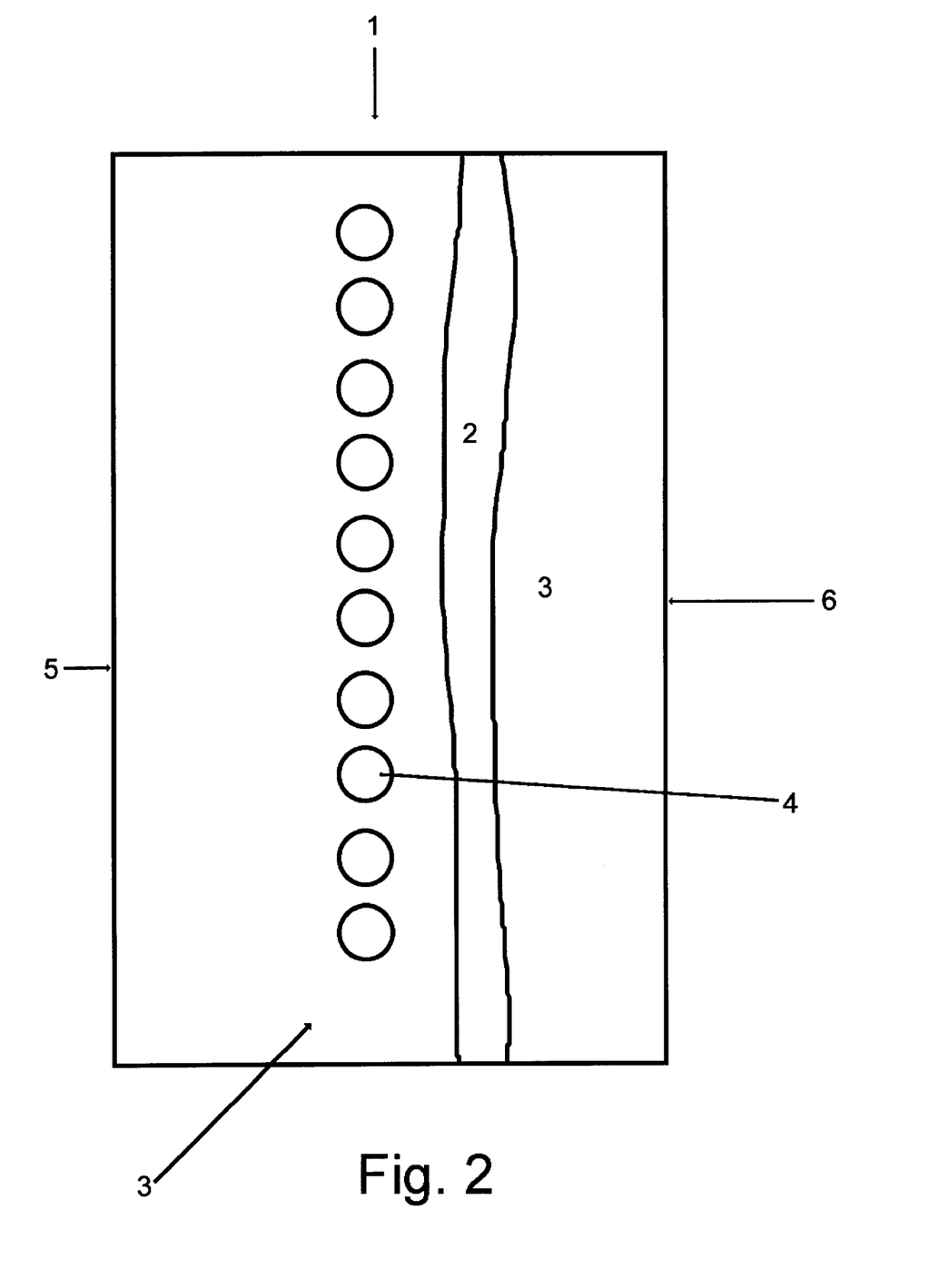
FIG. 2 is a stylized schematic depiction of a fuel cell anode used in the fuel cells of the instant invention.

FIG. 2 is a stylized schematic depiction of a fuel cell storage anode 1. The anode body includes a hydrophobic component 2 (such as polytetrafluoroethylene (PTFE)), and a hydrogen storage anode active material component 3 which includes the chemical hydride additive. While FIG. 2 shows the hydrophobic component 2 and the active electrode material component 3 as separate layers of material within the anode 1, they may also be intimately mixed into a single material. The anode 1, also includes a substrate component 4, which minimally acts as a current collector, but may also provide a support function. This substrate component is discussed herein below.

The anode 1 has two surfaces 5, 6. One surface 5 is adjacent a reactant (i.e. hydrogen or oxygen) inlet mechanism when incorporated into the fuel cell, while the other surface 6 is adjacent to the aqueous alkaline electrolyte. As stated above, the hydrophobic (PTFE) component 2 is either a layer within the anode or is intimately mixed with the anode material 3. In either case, the purpose of the hydrophobic (PTFE) material is to act as a water barrier, preventing water from escaping from the aqueous alkaline electrolyte of the fuel cell, while at the same time, allowing hydrogen to pass from the source thereof to the electrode material. Thus, a portion of the anode, surface 6 (and somewhat interiorly from the surface,) is in contact with the electrolyte and acts to oxidize hydrogen (providing electrons), while the remainder of the anode material (including surface 5) provides for dissociation of molecular hydrogen and storage of the dissociated hydrogen for later oxidation at surface 6.

The substrate component 4 acts as an electrical conductor and may also act as a support means. For example, if a powdered electrically conductive material, such as nickel, nickel alloy, copper, copper alloy or carbon, is mixed into the active material 3 then the material acts as an electrically conductive materials, but does not provide any support for the electrode materials per se.

It is preferable that the substrate component act as both an electrical conductor and a support structure. The electrode may be formed by pressing active material into a porous metal substrate. The conductivity of the electrode can be increased by increasing the conductivity of the electrode's porous metal substrate. Generally the porous metal substrate includes, but is not limited to, meshes, grid, matte, foil, foam, plate, and expanded metal. Preferably, the porous metal substrate used for the electrode is a mesh, grid, foam, or expanded metal. The substrate may be formed from any material which is electrically conductive and resistant to corrosion or chemical attack by the electrolyte. Nickel or nickel alloy is a very good material, but for high power applications it may be too resistive. Thus when high power is required, the substrate is formed from copper, copper-plated nickel, or a copper-nickel alloy, as taught by U.S. Pat. Nos. 5,856,047 (Venkatesan, et al.) and 5,851,698 (Reichman et al.), the disclosures of which are hereby incorporated by reference. As used herein, "copper" refers to either pure copper or an alloy of copper, and "nickel" refers to either pure nickel or an alloy of nickel. Using copper to form the porous metal substrate of the electrode has several important advantages. Copper is an excellent electrical conductor. Hence, its use as a substrate material decreases the resistance of the anode. This decreases the amount of fuel cell power wasted due to internal dissipation, and thereby provides a fuel cell having increased output power. Copper is also a malleable metal. Increased substrate malleability allows the substrate to more reliably hold the active hydrogen storage material that is compressed onto the substrate surface. This lessens the need to sinter the electrode after the active material has been compressed onto the substrate, thereby simplifying and reducing the cost of the anode manufacturing process.

The cathodes of the fuel cells of the present invention may be of any type, such as for example conventional platinum-based air electrodes. However, additional beneficial results will be obtained by utilization of the Ovonic cathodes described hereinafter.

One type of cathode contains an active material component which is catalytic to the dissociation of molecular oxygen into atomic oxygen, catalytic to the formation of hydroxyl ions (OH$^-$) from water and oxygen ions, corrosion resistant to the electrolyte, and resistant to poisoning. One material which is useful as an active material in the cathode is one in which a host matrix including at least one transition metal element which is structurally modified by the incorporation of at least one modifier element to enhance its catalytic properties. Such materials are disclosed in U.S. Pat. No. 4,430,391 ('391) to Ovshinsky, et al., published Feb. 7, 1984, the disclosure of which is hereby incorporated by reference. Such a catalytic body is based on a disordered non-equilibrium material designed to have a high density of catalytically active sites, resistance to poisoning and long operating life. Modifier elements, such as La, Al, K, Cs, Na, Li, C, and O structurally modify the local chemical environments of the host matrix including one or more transition elements such as Mn, Co and Ni to form the catalytic materials of the cathode. These low over-voltage, catalytic materials increase operating efficiencies of the fuel cells in which they are employed.

This type of cathode is formed in the same manner as conventional cathodes which use platinum catalysts, but the non-noble-metal catalysts described above are substituted for the platinum. The non-noble catalysts are finely divided and disbursed throughout a porous carbon matte-like material. The material may or may not have a conductive substrate as needed. If used the substrate can be as described herein above.

Another, more effective, cathode useful in the fuel cells of the present invention are those that operate through the mechanism of redox reactions which uniquely provide multiple degrees of freedom in selecting the operating voltages available for such fuel cells. Such cathodes provide the fuel cells in which they are used, particularly alkaline fuel cells, with a level of chemical energy storage within the cathode itself. This means that such fuel cells will have a "buffer" or "charge" available within the cathode at all times. These cathodes and the redox couples useful therein are more fully described in our copending U.S. patent application Ser. No. 09/797,352, filed Mar. 1, 2001 and entitled "Fuel Cell Cathodes and Their Fuel Cells", the disclosure of which is hereby incorporated by reference.

This type of fuel cell cathode comprises an active material capable of reversibly storing energy through the mechanism of a redox couple. The electrode has a first surface region situated to be exposed to molecular oxygen which includes a catalytically acting component promoting the absorption of oxygen through said first surface region and into said active material to chemically charge said active material through oxygen absorption.

The fuel cell cathodes of this invention may utilize redox couples, particularly metal/oxides couples selected from the group of metals consisting of copper, silver, zinc, cobalt and cadmium. Another useful redox couple is the nickel hydroxide/nickel oxyhydroxide couple.

These redox-couple cathodes may be further enhanced by the addition of materials which increase the resistance of the cathode active redox couple material toward dissolution in the electrolyte and assist in matching the gas phase kinetics of the cathode active redox couple material with its electrochemical kinetics. Such additives include, for example, LiAl alloys, Ag—B, Ag—Cr, Ag—LiAl, Ni, Cr, Mn, Mo, Misch Metal, Li/Co/Ni/Mn oxide, Sn, Hg, Pb, and Ga. These additives and the cathodes/fuel cells in which they are incorporated are more fully described in U.S. patent application Ser. No. 10/238,275, filed Sep. 10, 2002 and entitled "Modified Redox Couple Fuel Cell Cathodes and Fuel Cells Employing Same", the disclosure of which is hereby incorporated by reference.

This type of cathode is formed in much the same manner as the anode or may be formed in a manner similar to conventional cathodes which use platinum catalysts, but the redox couple materials described above are substituted for the platinum. The redox couple is finely divided and disbursed throughout a porous carbon material. The carbon material may be in the form of a powder, matte, foam, grid or mesh. The cathode may or may not have a conductive substrate as needed. If used the substrate can be as described in relation to the anode.

When the present fuel cells are run in reverse, as an electrolyzer, during an energy recapture process such as regenerative braking, water is electrolyzed into hydrogen and oxygen. That is, when electric powered vehicles are used in stop and go mode in inner cities, regenerative braking systems can recapture kinetic energy, and convert it to electrical energy. In this mode, the electric motors reverse their roles and become generators using up the kinetic energy of the motion. This causes a spike of current which amounts to about 10% of the normal operating load. A conventional fuel cell (alkaline or PEM) cannot accept such surges. This feedback of energy would cause rapid hydrogen and oxygen evolution which would cause the catalysts to lose their integrity and adhesion and also cause corrosion, especially at the oxygen electrode, thereby undermining the overall system performance.

In the inventive fuel cell, this will not be a problem, because the hydrogen storage anode and the oxide couple cathode will take the surge current and become charged with the produced hydrogen or oxygen respectively.

It should be noted that the anode and cathode active materials of the instant invention are robust and very resistant to poisoning. This is true because the increased number of catalytically active sites of these materials not only increases catalytic activity, but enables the materials to be more resistant to poisoning, because with materials of the present invention numerous catalytically active sites can be sacrificed to the effects of poisonous species while a large number of non-poisoned sites still remain active to provide the desired catalysis. Also, some of the poisons are inactivated by being bonded to other sites without effecting the active sites.

Figure 3:
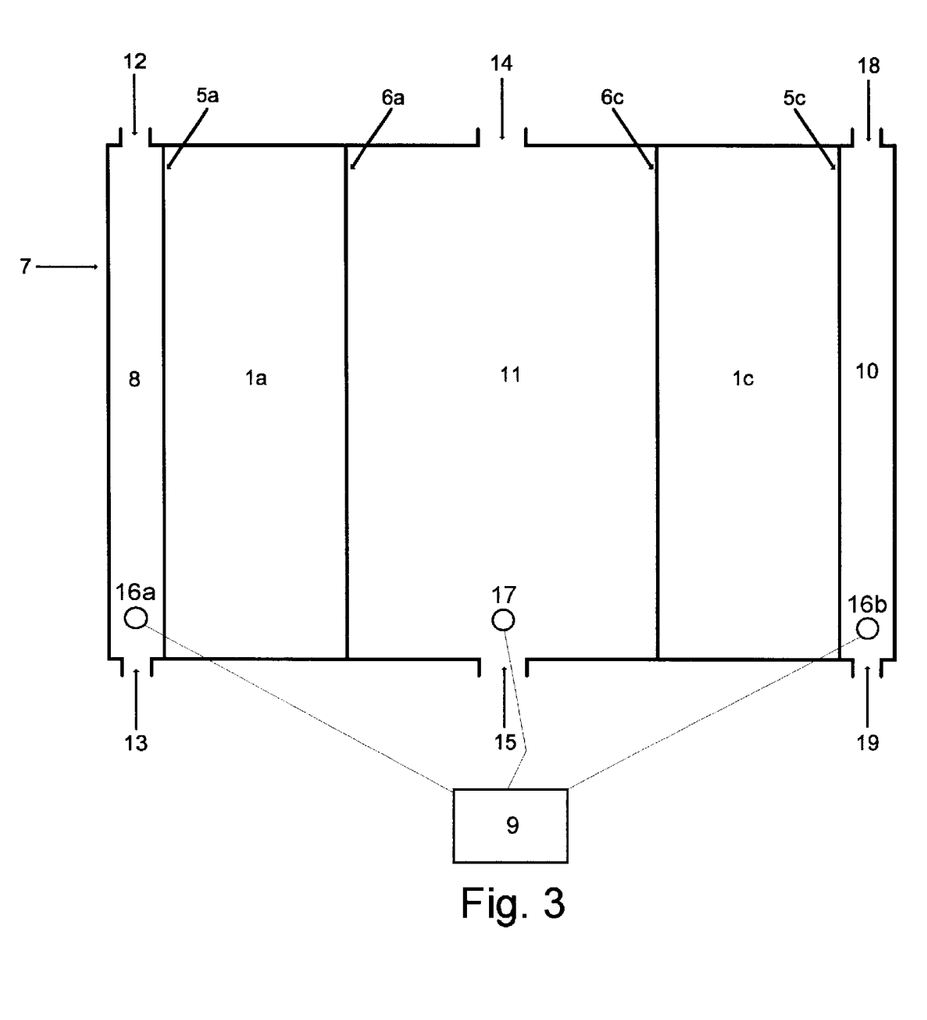
FIG. 3 is a stylized schematic depiction of the instant startup alkaline fuel cell of the instant invention.

FIG. 3 is a stylized schematic depiction of an alkaline fuel cell 7 incorporating the electrodes 1$a$, 1$c$ ("a" designates anode and "c" designates cathode) of the instant invention. The fuel cell 7 consists of three general sections: 1) an anode section, which includes the anode 1$a$ and a hydrogen supply compartment 8; 2) the electrolyte compartment 11; and 3) the cathode section, which includes the cathode 1$c$ and the oxygen (air) supply compartment 10.

In the anode section, hydrogen or hydrogen containing gas mixtures is supplied under pressure to the hydrogen supply compartment 8 through hydrogen inlet 12. Hydrogen is then absorbed through surface 5$a$ into the anode 1$a$. The absorbed hydrogen is catalytically broken down by the anode active material into atomic hydrogen which is stored in the hydrogen storage material as a hydride, and then finally reacts at surface 6$a$ with hydroxyl ions to form water. It should be noted that the heat of hydride formation helps to warm the fuel cell to it's optimal operating temperature. Any unabsorbed hydrogen and other contaminant gases or water vapor in the hydrogen supply are vented through outlet 13. The gases that are vented may be recycled if enough hydrogen is present to warrant recovery. Otherwise the hydrogen may be used to provide a source of thermal energy if needed for other components such as a hydride bed hydrogen storage tank.

The electrolyte compartment 11 holds (in this specific example) an aqueous alkaline electrolyte in intimate contact with the anode 1$a$ and the cathode 1$c$. The alkaline solution is well known in the art and is typically a potassium hydroxide solution. The electrolyte provides hydroxyl ions which react with hydrogen ions at surface 6$a$ of the anode 1$a$ and water molecules which react with oxygen ions at surface 6$c$ of the cathode 1$c$. The electrolyte is circulated through compartment 11 via inlet 14 and outlet 15 (in alternative embodiments, the electrolyte may be deliberately immobilized as by jelling, etc.) The circulated electrolyte may be externally heated or cooled as necessary, and the concentration of the electrolyte can be adjusted (as via wicking, etc.) as needed to compensate for the water produced by the cell and any losses due to evaporation of water through the electrodes. Systems for conditioning the fuel cell electrolyte are well known in the art and need not be further described in detail herein.

In the cathode section, oxygen, air, or some other gaseous mixture containing oxygen is supplied to the oxygen supply compartment 10 through oxygen inlet 18. Oxygen is then absorbed through surface 5$c$ into the cathode 1$c$. The absorbed oxygen is catalytically broken down by the cathode active material into ionic oxygen, which finally reacts at surface 6$c$ (via the redox couple) with water molecules to form hydroxyl ions. Any unabsorbed oxygen and other gases in the feed (e.g. nitrogen, carbon dioxide, etc.) or water vapor in the oxygen supply are vented through outlet 19.

The fuel cell may further include a pressure servomechanism 9 for detecting and balancing the pressure between the gas inlet chambers 8, 10 and the electrolyte chamber 11. The pressure servomechanism 9 receives input pressure information from gas pressure sensors 16$a$ and 16$b$ within the gas input chambers 8, 10 of the fuel cell and from a liquid pressure sensor 17 within the electrolyte chamber of the fuel cell 11. The pressure servomechanism 9 determines if there is a deleterious pressure difference between the gas and liquid chambers and adjust the pressures thereof accordingly to alleviate the pressure differential. By using such a pressure servomechanism 9, leakage of liquid into the gas chambers and vise-versa is eliminated.

Figure 4:
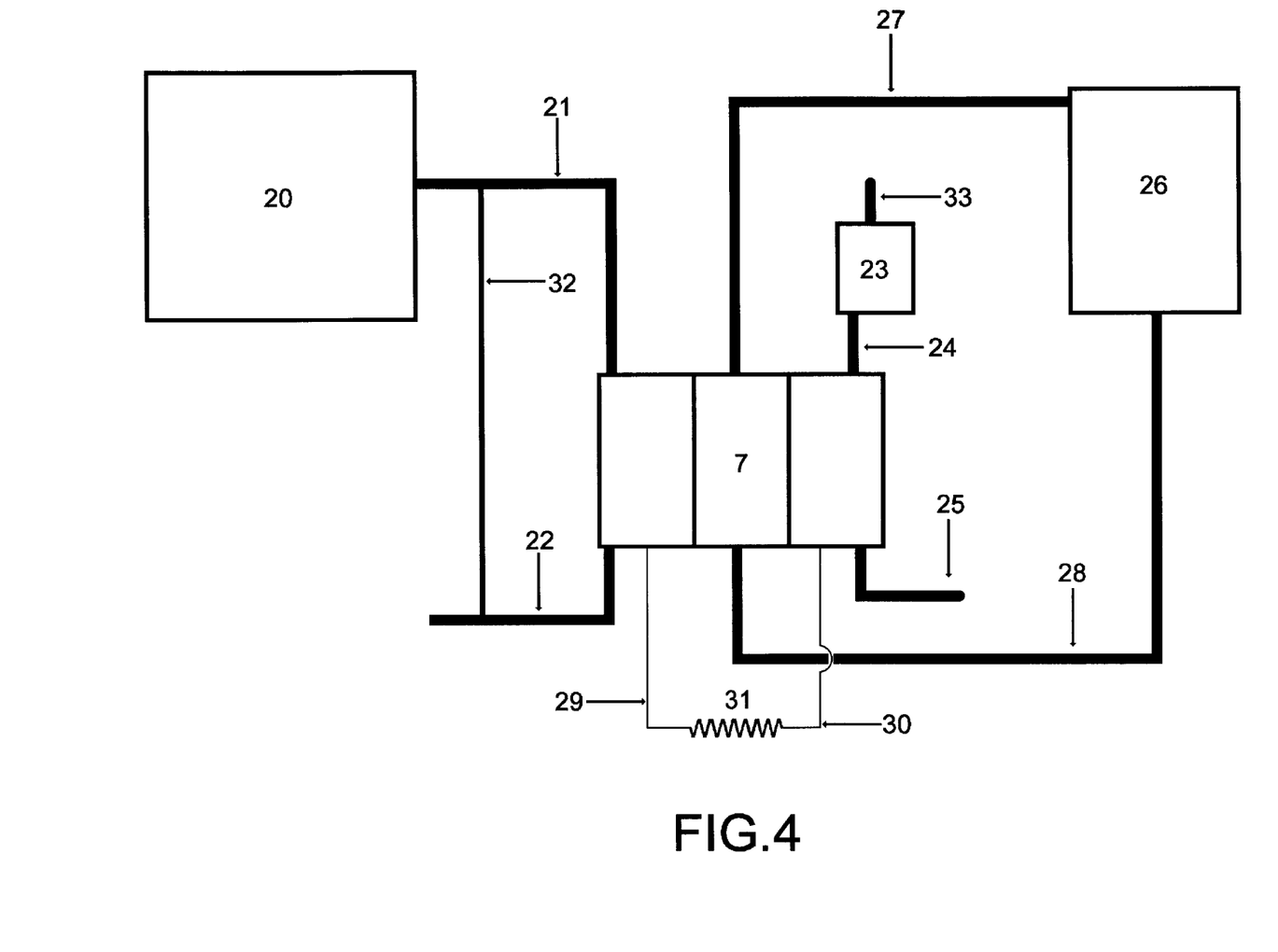
FIG. 4 is a stylized schematic depiction of an energy supply system incorporating the instant startup alkaline fuel cell of the instant invention.

FIG. 4 is a stylized schematic depiction of an energy supply system incorporating the alkaline fuel cell 7 of the instant invention. The energy supply system also includes a source of hydrogen 20. The source may be of any known type, such as a hydride bed storage system, a compressed hydrogen storage tank, a liquid hydrogen storage tank, or a hydrocarbon fuel reformer. The preferred source is a metal hydride storage system. The hydrogen from the source 20 is transported to the fuel cell 7 via input line 21, and excess gases are vented through output line 22. A portion of the gases from output line 22 may be recycled to input line 21 through recycle line 32. The energy supply system also includes a source of oxygen, which is preferably air for economic reasons. The air is drawn into line 33 and then can be passed through a carbon dioxide scrubber 23. The air is then transported to the fuel cell 7 via input line 24. Excess air and unused gases are vented through output line 25. Since this gas stream contains no harmful gases, it may be vented to the environment directly.

The energy supply system also includes an electrolyte recirculation system. The electrolyte from the fuel cell 7 is removed through output line 28 and sent to an electrolyte conditioner 26. The electrolyte conditioner 26 heats or cools the electrolyte as needed and removes/adds water as necessary. The conditioned electrolyte is then returned to the fuel cell 7 via input line 27.

Finally the energy supply system includes electrical leads 29 and 30 which supply electricity from the fuel cell 7 to a load 31. The load can be any device requiring power, but particularly contemplated is the power and drive systems of an automobile.

The instant fuel cell and energy supply systems incorporating it are particularly useful for applications in which instant start and energy recapture are requirements thereof, such as for example in powering a vehicle. For instance, in consumer vehicle use, a fuel cell that has the built in fuel and oxidizer storage of the instant invention has the advantage of being able to start producing energy instantly from the reactants stored in it's electrodes. Thus, there is no lag time while waiting for hydrogen to be supplied from external sources.

Additionally, because hydrogen and oxygen can be adsorbed and stored in the respective electrode materials of the fuel cell, energy recapture can be achieved as well. Therefore, activities such as regenerative braking, etc., can be performed without the need for an battery external to the fuel cell because any reactants produced by running the fuel cell in reverse will be stored in the electrodes of the fuel cell. Therefore, in essence, fuel cells employing the instant active electrode materials are the equivalent of a fuel cell combined with a battery. In such a system employing the redox couples oxygen is also able to be stored within the electrode to a significant degree as an oxidized component of the couple, preferably a metal/metal oxide couple, a hydroxide/oxyhydroxide, or combinations thereof.

The novel electrochemical cell of the present invention also enables the practice of the method of the invention which, in one embodiment thereof, comprises the indirect and continuous introduction of both the fuel, preferably hydrogen, and the reactant which oxidizes the fuel, preferably oxygen, for the continuous operation of the electrochemical cell as a fuel cell. That is, the hydrogen is, during operation, continuously introduced through a catalytic region in the negative electrode and continuously stored as a hydride in a region of material in the negative electrode which is capable of reversibly storing and releasing hydrogen. Simultaneously therewith hydrogen is electrochemically released from the negative electrode, on its electrolyte side, to participate in the cell reaction process so that continuous supply at the gas side, storage within, and release of hydrogen at the electrolyte side of, the negative electrode is made possible.

At the same time oxygen is continuously introduced at the gas side of the positive electrode through a catalytic region and chemically stored as a material in the form of the charged state of an oxide couple which participates in the cell reaction. Simultaneously with the introduction and chemical storage of the oxygen as just explained the material of the oxide couple which is in the charged state participates in the cell reaction to generate electrical power. Thus an electrochemical cell is continuously operated through the supply to the gas side, storage within, and release from the electrolyte side of, the oxidant so that operation as a fuel cell is enabled. The unique method of the invention of operation of an electrochemical cell as a fuel cell is thus made possible. In the situations in which the fuel cell is run "backwards" or as an electrolyzer to recapture and store energy, such as for example, during regenerative braking, the operating nature as described earlier would not be considered to be disruptive to "continuous" operation.

The drawings, discussion, descriptions, and examples of this specification are merely illustrative of particular embodiments of the invention and are not meant as limitations upon its practice. It is the appended claims, including all equivalents, that define the scope of the invention.

We claim:

1. A fuel cell anode comprising:
   a hydrogen storage alloy; and
   a water reactive chemical hydride intimately mixed with said hydrogen storage alloy.

2. The fuel cell anode of claim 1, wherein said water reactive chemical hydride is selected from the group consisting of hydrides or borohydrides of alkali metals, alkaline earth metals and alloys thereof.

3. The fuel cell anode of claim 2, wherein said water reactive chemical hydride is sodium borohydride.

4. The fuel cell anode of claim 2, wherein said water reactive chemical hydride is potassium hydride.

5. The fuel cell anode of claim 2, wherein said water reactive chemical hydride is sodium hydride.

6. The fuel cell anode of claim 1, wherein said water reactive chemical hydride is lithium aluminum hydride.

7. The fuel cell anode of claim 1, wherein said water reactive chemical hydride is calcium nickel hydride.

8. The fuel cell anode of claim 1, wherein said hydrogen storage alloy is selected from the group consisting of rare-earth/Misch metal alloys, zirconium alloys, titanium alloys, and mixtures or alloys thereof.

9. The fuel cell anode of claim 8, wherein said hydrogen storage alloy has the following composition:

$$(\text{Base Alloy})_a\text{Co}_b\text{Mn}_c\text{Fe}_d\text{Sn}_e$$

where the Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr; b is 0 to 7.5 atomic percent; c is 13 to 17 atomic percent; d is 0 to 3.5 atomic percent; e is 0 to 1.5 atomic percent; and a+b+c+d+e=100 atomic percent.

10. The fuel cell anode of claim 8, wherein said hydrogen storage alloy has the following composition, in atomic percent: 10.5% La, 4.3% Ce, 0.5 Pr, 1.4% Nd, 60.0% Ni, 12.7% Co, 5.9% Mn and 4.7% Al.

11. The fuel cell anode of claim 1, further including a hydrophobic component.

12. The fuel cell anode of claim 11, wherein said hydrophobic component is polytetrafluoroethylene (PTFE).

13. The fuel cell anode of claim 12, wherein said PTFE is intimately mixed with said hydrogen storage alloy and said water reactive chemical hydride.

14. The fuel cell anode of claim 12, wherein said PTFE is a layer within said anode.

15. The fuel cell anode of claim 1, further including a substrate component which provides only for electrical conductivity and comprises an electrically conductive powder intimately mixed with said hydrogen storage material and said water reactive chemical hydride.

16. The fuel cell anode of claim 15, wherein said electrically conductive powder comprises at least one material selected from the group consisting of copper, a copper alloy, nickel, a nickel alloy, and carbon.

17. The fuel cell anode of claim 1, further including a substrate component which provides for both electrical conductivity and mechanical support and comprises an electrically conductive mesh, grid, foam, matte, foil, plate, or expanded metal.

18. The fuel cell anode of claim 17, wherein said substrate component comprises an electrically conductive mesh, grid, foam, or expanded metal.

19. The fuel cell anode of claim 18, wherein said mesh, grid, foam, or expanded metal is formed from nickel or nickel alloy.

20. The fuel cell anode of claim 18, wherein said mesh, grid, foam, or expanded metal is formed from copper, copper plated nickel or a copper-nickel alloy.

21. A fuel cell including an anode, said anode comprising:
    a hydrogen storage alloy; and
    a water reactive chemical hydride intimately mixed with said hydrogen storage alloy.

22. The fuel cell of claim 21, wherein said water reactive chemical hydride is selected from the group consisting of hydrides or borohydrides of alkali metals, alkaline earth metals and alloys thereof.

23. The fuel cell of claim 22, wherein said water reactive chemical hydride is sodium borohydride.

24. The fuel cell of claim 22, wherein said water reactive chemical hydride is potassium hydride.

25. The fuel cell of claim 22, wherein said water reactive chemical hydride is sodium hydride.

26. The fuel cell of claim 21, wherein said water reactive chemical hydride is lithium aluminum hydride.

27. The fuel cell of claim 21, wherein said water reactive chemical hydride is calcium nickel hydride.

28. The fuel cell of claim 21, wherein said hydrogen storage alloy is selected from the group consisting of rare-earth/Misch metal alloys, zirconium alloys, titanium alloys, and mixtures or alloys thereof.

29. The fuel cell of claim 28, wherein said hydrogen storage alloy has the following composition:

$$(\text{Base Alloy})_a \text{Co}_b \text{Mn}_c \text{Fe}_d \text{Sn}_e$$

where the Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr; b is 0 to 7.5 atomic percent; c is 13 to 17 atomic percent; d is 0 to 3.5 atomic percent; e is 0 to 1.5 atomic percent; and a+b+c+d+e=100 atomic percent.

30. The fuel cell of claim 28, wherein said hydrogen storage alloy has the following composition, in atomic percent: 10.5% La, 4.3% Ce, 0.5 Pr, 1.4% Nd, 60.0% Ni, 12.7% Co, 5.9% Mn and 4.7% Al.

31. The fuel cell of claim 21, wherein said anode further includes a hydrophobic component.

32. The fuel cell of claim 31, wherein said hydrophobic component is polytetrafluoroethylene (PTFE).

33. The fuel cell of claim 32, wherein said PTFE is intimately mixed with said hydrogen storage alloy and said water reactive chemical hydride.

34. The fuel cell of claim 32, wherein said PTFE is a layer within said anode.

35. The fuel cell of claim 21, wherein said anode further includes a substrate component which provides only for electrical conductivity and comprises an electrically conductive powder intimately mixed with said hydrogen storage material and said water reactive chemical hydride.

36. The fuel cell of claim 35, wherein said electrically conductive powder comprises at least one material selected from the group consisting of copper, a copper alloy, nickel, a nickel alloy, and carbon.

37. The fuel cell of claim 21, wherein said anode further includes a substrate component which provides for both electrical conductivity and mechanical support and comprises an electrically conductive mesh, grid, foam, matte, foil, plate, or expanded metal.

38. The fuel cell of claim 37, wherein said substrate component comprises an electrically conductive a mesh, grid, foam, or expanded metal.

39. The fuel cell of claim 38, wherein said mesh, grid, foam, or expanded metal is formed from nickel or nickel alloy.

40. The fuel cell of claim 38, wherein said mesh, grid, foam, or expanded metal is formed from copper, copper plated nickel or a copper-nickel alloy.

41. The fuel cell of claim 21, wherein fuel cell further includes a cathode which comprises:
    a) a hydrophobic component for preventing water from passing through said cathode;
    b) a substrate component providing for mechanical support and/or current collection; and
    c) a cathode active material.

42. The fuel cell of claim 41, wherein said cathode active material is resistant to poisoning.

43. The fuel cell of claim 42, wherein said cathode active material comprises a host matrix including at least one transition metal element which is structurally modified by the incorporation of at least one modifier element to enhance its catalytic properties.

44. The fuel cell of claim 43, wherein said cathode active material comprises a host matrix which includes one or more transition elements from the group consisting of Mn, Co and Ni and at lease one modifier element selected from the group consisting of La, Al, K, Cs, Na, Li, C, and O which structurally modifies the local chemical environments of said host matrix.

45. The fuel cell cathode of claim 41, wherein said cathode active material comprises a redox couple which provides said cathode with oxygen storage capacity.

46. The fuel cell cathode of claim 45, wherein said redox couple is nickel hydroxide/nickel oxyhydroxide.

47. The fuel cell cathode of claim 45, wherein said redox couple comprises a metal/metal oxide couple of an element selected from the group consisting of copper, silver, zinc and cadmium.

48. The fuel cell cathode of claim 21, wherein said fuel cell further includes a pressure servomechanism for detecting and equalizing pressure differentials between gases and liquids within said fuel cell.

* * * * *